June 2, 1953　　　L. E. ASKE ET AL　　　2,640,902
TEMPERATURE RESPONSIVE CONTROL
Filed June 27, 1952
Fig. 1
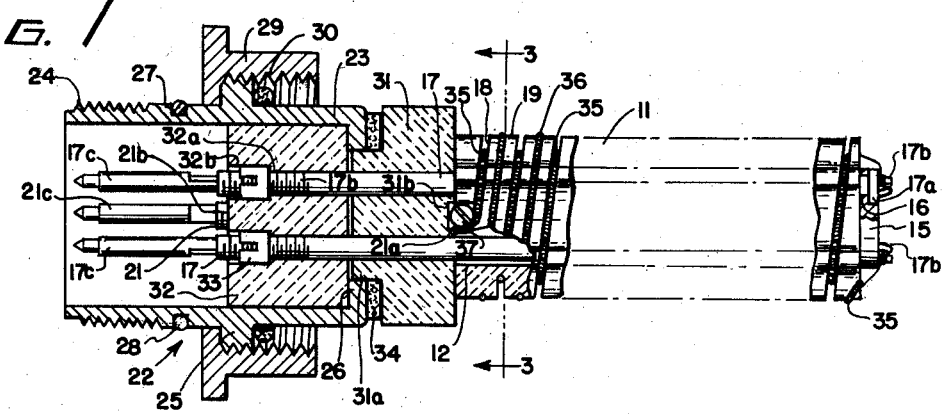
Fig. 2
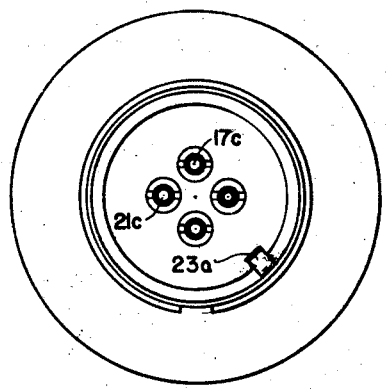
Fig. 3
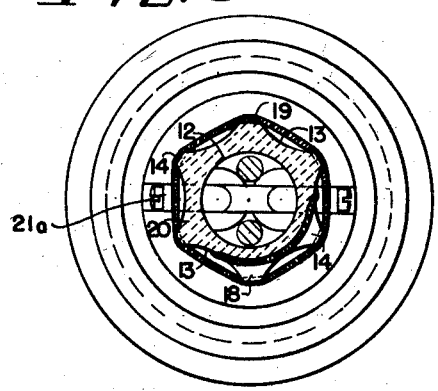
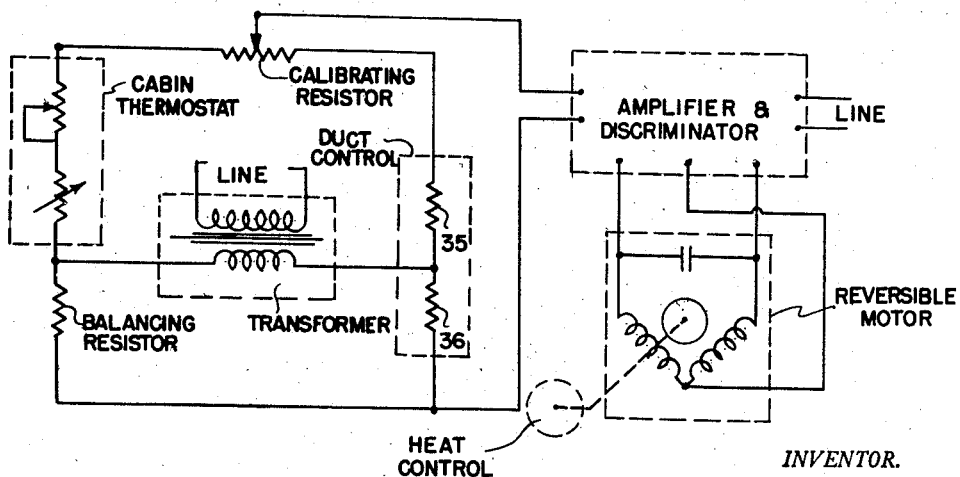
Fig. 4
INVENTOR.
LEONARD E. ASKE
BY JAMES A. THAYER
George H Fisher
ATTORNEY Patented June 2, 1953

2,640,902

UNITED STATES PATENT OFFICE 2,640,902

TEMPERATURE RESPONSIVE CONTROL

Leonard E. Aske and James A. Thayer, Minneapolis, Minn., assignors to Minneapolis-Honeywell Regulator Company, Minneapolis, Minn., a corporation of Delaware Application June 27, 1952, Serial No. 296,054

9 Claims. (Cl. 201—63)

This invention relates to temperature responsive controls in general and, more specifically, to a control which is responsive to rate of temperature change for causing an adjustment of a heating system to prevent overheating of a space, the temperature of which is being controlled.

The primary use of the invention is in cabin temperature heating equipment for jet airplanes. These systems have ducts leading from the compressors of the jet engines to the cabins with one of the control devices constituting this invention positioned in said ducts so as to be responsive to changes in the temperature of the air flowing from said compressor to the cabin of the airplane. The control device is suitably connected in a bridge type of control circuit for controlling a bypass valve for bypassing a portion of the air in the heating duct to the extent necessary to prevent rapid temperature rises of the air from overshooting the control temperature and thus overheating the cabin, particularly in the cases where the rate of air flow through the duct from the compressor is substantially constant.

One of the objects of this invention is to provide a compact single unit which may be readily inserted in an opening in a heating duct and which will be responsive to rate of temperature change to exert a control function on apparatus for adjusting the amount of heating medium flowing out of the heating duct, to maintain a uniform temperature in a space at the end of the heating duct.

Another object of the invention is to provide a relatively inexpensive, sturdy and reliable temperature responsive control unit which will accurately adjust control apparatus for regulating the flow of a heating medium.

Still another object of the invention is to provide on a single bobbin having electrical terminals thereon a pair of temperature responsive wires wherein one of said wires is quickly responsive to temperature changes in the surrounding air and the other is slowly responsive to the same temperature changes.

Other objects of the invention will become readily apparent upon reading the following detailed description of the invention in conjunction with the accompanying drawing wherein:

Figure 1 is an elevational view of the temperature responsive control device with portions thereof in cross-section and other portions thereof broken away;

Figure 2 is an end elevational view of the base portion of the control device;

Figure 3 is a cross-sectional view of the control device taken along line 3—3 of Figure 1; and Figure 4 is a control circuit diagram showing the use of the control device as a duct control in a bridge circuit for the temperature regulating apparatus.

The invention is illustrated in its preferred form. A hollow ceramic bobbin 11 has an axial bore 12 therein extending from the left-hand end thereof, as viewed in Figure 1, to a point near the right-hand end thereof. The bobbin also has a plurality of concentrically arranged and longitudinally extending arcuate grooves 13 extending the full length of the bobbin, which form ribs 14 therebetween. The closed end portion 15 of the bobbin has two diametrically opposed longitudinally extending stepped bores 16 through which extend conductor rods 17. Each rod 17 has a head portion 17a which fits in the larger diameter portion of the stepped bore 16 and has a slotted end portion 17b extending beyond the head 17a for a purpose hereinafter to be described. There are two co-extensive spiral grooves formed in the outer surface of the bobbin. The groove 18 is a deep groove that extends continuously around the bobbin inasmuch as it is sufficiently deep to extend below the surface of the deepest portion of the longitudinal grooves 13. The second groove 19 is an interrupted groove in that it is only deep enough to be formed in the outer portion of the ribs 14. These grooves start and end at each end of the bobbin at points spaced apart around the bobbin approximately 180 degrees. With this arrangement, every other groove in the bobbin longitudinally thereof will be a deep groove or, putting it another way, a deep groove is positioned between adjoining shallow grooves throughout the length of the bobbin. The left-hand end of the bobbin 11, as viewed in Figure 1, has a transverse groove 20 therein for the reception of a transversely extending arm 21a of a conductor rod 21.

The bobbin 11 is rigidly secured to a connector member, generally designated by the reference numeral 22. This member has a sleeve-like member 23 which is externally threaded at 24, has an external annular rib 25 intermediate its ends, has an inwardly extending annular flange at its right-hand end, as viewed in Figure 1, and has an annular groove in the outer surface thereof between the threaded portion 24 and the shoulder or rib 25 for the reception of a split retaining ring 26. Swivelly mounted on the member 23 between the retaining ring 26 and the rib 25, is an internally threaded clamping nut 29 that is adapted to be screw threaded onto an externally threaded nipple (not shown) forming an opening in a heating duct, which is also not shown in the drawing. A sealing ring 30 is preferably provided to assume a gas tight seal between the heating conduit and the connector 23, when the nut 29 is screwed upon the nipple of the conduit. This sealing ring may be made of any conventional material suitable for this purpose.

The bobbin 11 is electrically insulated from the metallic connector 23 by means of a ceramic base member 31 and has a reduced diameter portion 31a that is adapted to fit snugly in the opening provided by the inner edge of the flange 26. The member 31 has four apertures therein for the reception of the conductor rods 17 and 21 and a transverse groove 31b in the right-hand end thereof in alignment with the transverse groove 20 in the adjacent end of the bobbin 11, for the reception of the transverse extending arm 21a of the rods 21. Positioned between the flange 26 and the enlarged portion of the member 31 is a sealing washer made of any suitable well-known material. Positioned within the connector 22 is a second base member 32 of a diameter the same as or slightly less than the internal diameter of the member 23 and made of the same material as the member 31. The member 32 bears against the opposite side of the flange 26 from the member 31 and has four apertures 32a therein in alignment with the above-mentioned apertures in the members 31, through which the conductor rods 17 and 21 extend. The apertures 32a are counter-bored at 32b for the reception of clamping nuts 33 which are screw threaded upon the threaded portions 17b and 21. When the nuts 33 are tightly threaded upon the rods 17 and 21, the bobbin 11 will be tightly drawn against the base member 31, the member 32 will be tightly drawn against the inner surface of the flange 26 and the sealing washer 34 will be compressed between the outer surface of the flange 26 and the opposed portion of the member 31, to sealingly and rigidly support the bobbin 11 on the connector 22.

Extending axially from the threaded end portions of the rods 17 and 21 are portions 17c and 21c that are formed in the shape of connector prongs or tines adapted to frictionally fit into sockets of a socket member (not shown) having a swivelly-mounted, internally-threaded clamping nut adapted to be threaded upon the external threads 24 of the connector member 23. Said unillustrated socket member will have suitable leads therein for connecting the control in the circuit illustrated in Figure 4. An inwardly bent ear portion 23a of the member 23 is adapted to cooperate with a groove in the socket member to assure proper mating of the members.

The temperature sensing elements of the control device consist of two coiled wires 35 and 36 wound around the bobbin in the grooves 18 and 19, respectively. One end of the wire 35 is electrically connected to the arm 21a by means of a screw 37 threaded into the end of the arm. The other end of the coiled wire 35 is electrically connected to the bifurcated ends 17b of one of the conductor rods 17 by being wrapped around and passing through the bifurcation. The end 17b is pinched together over the wire as well as being soldered thereto. The other coiled wire 19 is similarly connected to the other conductor rods 17 and 21 at each end of the bobbin.

It will be noted that with the coiled wires 35 and 36 positioned in the grooves as described above, a major portion of the surface of the wire 36 will be exposed to the air surrounding and moving over the bobbin. On the other hand, the wire 35 will be only slightly exposed to the air flowing over the bobbin in that there will be very little air flow down into the deep grooves in which the wire is positioned. This is primarily due to the deep grooves and partially due to the shielding effect provided by the wire 36 with respect to the open mouth of the groove 18. With this arrangement, the coiled wire 36 will quickly respond to temperature changes in the air surrounding the bobbin while the coiled wire 35 will be very slow in responding to the same temperature changes.

Operation

With the control device installed in a cabin heating system, such as are found in jet airplanes, and with the temperature responsive wires 35 and 36 connected in a conventional bridge type of circuit, as illustrated in Figure 4 of the drawing, and with the airplane flying at a normal cruising speed, the elements of the apparatus and controls therefor will be in a steady position for delivering heated air to the cabin, to maintain the desired temperature setting of the cabin thermostat.

Upon a rise or a fall in the cabin temperature, the cabin thermostat will increase or decrease in resistance so as to cause an unbalance in the bridge circuit in a conventional manner to cause the reversible motor of the heat control to adjust the heat control to reestablish the desired cabin temperature and thus rebalance the bridge circuit.

Should the flight condition of the airplane change so as to rapidly change the temperature of the air being supplied to the cabin from the compressor of the jet engine, the quickly responsive temperature responsive wire 36 will change in resistance so as to unbalance the bridge circuit. The unbalancing of the bridge circuit will function in the same manner as the unbalancing resulting from a change in cabin temperature, to cause the reversible motor to move the heat control to a position which will prevent overheating or underheating of the cabin.

It will thus be seen that the control device constituting this invention will act to anticipate undesired temperature changes in the cabin and will adjust the heat control means in the manner to prevent the undesired change.

As the control system forms no part of this invention, no detailed description will be made of the various elements of the conventional system illustrated to show the utility of this invention. A similar system is illustrated in A. P. Upton Patent No. 2,423,534. The control device is illustrated in Figure 4 of the drawing as a duct control in that this is the preferred use for the invention. As the duct-work of an airplane obviously should be maintained as small as possible, it is readily apparent why it is highly desirable to have a very compact control device to keep at a minimum the resistance of air flow through the ducts. Also, in view of the fact that the control is subjected to quite high temperatures, the necessity for the control to be sturdy and reliable in operation is deemed to be obvious.

While we have described the preferred embodiment of the invention and have illustrated and described the primary use for the control, it is to be readily understood that various modifications may be made in the invention without departing from the spirit thereof. There-

We claim as our invention:

1. A temperature responsive device, for exerting a control function in response to rate of temperature change, comprising an electrically insulating bobbin having a plurality of grooves extending longitudinally thereof, a shallow spiral groove in the outer bobbin surface interrupted by each of said longitudinally extending grooves, a deep and continuous spiral groove in the outer bobbin surface with the beginning and ending thereof substantially 180° apart from the beginning and ending of said interrupted groove, a first temperature responsive wire in said interrupted groove and spanning said longitudinal grooves so as to be quickly responsive to temperature changes in the surrounding air, a second temperature responsive wire in said continuous groove as to be substantially shielded from and slowly responsive to temperature changes in the surrounding air, and means for supporting said bobbin.

2. A temperature responsive device, for exerting a control function in response to rate of temperature change, comprising electrically insulating bobbin having a plurality of grooves extending longitudinally thereof, a shallow spiral groove in the outer bobbin surface interrupted by each of said longitudinally extending grooves, a deep and continuous spiral groove in the outer bobbin surface with the beginning and ending thereof substantially 180° apart from the beginning and ending of said interrupted groove, a first temperature responsive wire in said interrupted groove and spanning said longitudinal grooves so as to be quickly responsive to temperature changes in the surrounding air, and a second temperature responsive wire in said continuous groove as to be substantially shielded from and slowly responsive to temperature changes in the surrounding air.

3. In a temperature responsive device for exerting a control function in response to rate of temperature change, the combination comprising a hollow electrically insulating bobbin having a plurality of grooves extending longitudinally thereof, a shallow spiral groove in the outer bobbin surface interrupted by each of said longitudinally extending grooves, a deep and continuous spiral groove in the outer bobbin surface substantially parallel to said interrupted groove, a first temperature responsive wire in said interrupted groove and spanning said longitudinal grooves so as to be quickly responsive to temperature changes in the surrounding air, a second temperature responsive wire in said continuous groove as to be substantially shielded from and slowly responsive to temperature changes in the surrounding air, a pair of connector prongs extending through the hollow bobbin and secured to the adjacent ends of said wires, a second pair of connector prongs connected to the other end of said wires, and means supporting said bobbin and prongs for connecting the same in a heat controlling system.

4. In a temperature responsive device for exerting a control function in response to rate of temperature change, the combination comprising an electrically insulating bobbin having a plurality of projections thereon positioned around and longitudinally thereof and a continuous groove in the outer bobbin surface a first temperature responsive wire wound on said projections so as to be substantially fully exposed to the surrounding atmosphere and quickly responsive to temperature changes in the surrounding atmosphere, a second temperature responsive wire in said continuous groove as to be substantially shielded from and slowly responsive to temperature changes of said atmosphere, and means for supporting said bobbin.

5. A control device comprising a bobbin having a plurality of concentrically arranged and longitudinally extending ribs on the outer surface thereof, an interrupted spiral groove extending around and longitudinally in the outer surfaces of said ribs, a deeper and continuous spiral groove in said bobbin and ribs and substantially parallel to the interrupted spiral groove, a first temperature responsive resistance wire in said interrupted spiral groove, a second temperature responsive resistance wire in said continuous spiral groove, a base member, a pair of prongs extending through said base member and said bobbin and connected at their outer ends to the outer ends of said first and second wires, and a second pair of shorter prongs extending through said base member and connected to the inner ends of said first and second wires.

6. A control device comprising a bobbin having a plurality of concentrically arranged and longitudinally spaced projections on the outer surface thereof, an interrupted spiral groove extending around and longitudinally in the outer surfaces of said projections, a deeper and continuous spiral groove in said bobbin and substantially parallel to the interrupted spiral groove, a first temperature responsive resistance wire in said interrupted spiral groove, a second temperature responsive resistance wire in said continuous spiral groove, a base member, a pair of prongs extending through said base member and said bobbin and connected at their outer ends to the outer ends of said first and second wires, and a second pair of shorter prongs extending through said base member and connected to the inner ends of said first and second wires.

7. The combination comprising a hollow bobbin having a plurality of concentrically arranged and longitudinally extending ribs on the outer surface thereof, an interrupted spiral groove extending around and longitudinally in the outer surfaces of said ribs, a deeper and continuous spiral groove in said bobbin and ribs and substantially parallel to the interrupted spiral groove, a first temperature responsive resistance wire in said interrupted spiral groove, a second temperature responsive resistance wire in said continuous spiral groove, a first and second base member, a connector sleeve having an internal flange on one end thereof and positioned between said base members, a first pair of prongs extending through said base members, said flange and said bobbin and connected at their outer ends to the outer ends of said first and second wires, and a second pair of shorter prongs extending through said base members and flange and connected to the inner ends of said first and second wires.

8. The combination defined in claim 7 wherein said first pair of prongs has means thereon for drawing said bobbin, base members and flange tightly together.

9. In a control device, the combination comprising a bobbin having a plurality of concentrically arranged and longitudinally spaced projections on the outer surface thereof, an interrupted groove extending around and longitudinally in the outer surfaces of said projections, a deeper and continuous groove in said bobbin and projections and substantially parallel to the interrupted groove, a first temperature responsive resistance wire in said interrupted groove, a second temperature responsive resistance wire in said continuous groove, a base member, a pair of prongs extending through said base member and said bobbin and connected at their outer ends to the outer ends of said first and second wires, and a second pair of shorter prongs extending through said base member and connected to the inner ends of said first and second wires.

LEONARD E. ASKE.
JAMES A. THAYER.

No references cited.